US012417779B2

(12) United States Patent
Lu et al.

(10) Patent No.: US 12,417,779 B2
(45) Date of Patent: Sep. 16, 2025

(54) AUDIO SIGNAL PROCESSING METHOD, DEVICE AND STORAGE MEDIUM FOR REDUCING SIGNAL DELAY

(71) Applicant: EVOCO LABS CO., LTD., Shanghai (CN)

(72) Inventors: Congxi Lu, Shanghai (CN); Linkai Li, Shanghai (CN); Yufan Yuan, Shanghai (CN); Hongcheng Sun, Shanghai (CN)

(73) Assignee: EVOCO LABS CO., LTD., Shanghai (CN)

( * ) Notice: Subject to any disclaimer, the term of this patent is extended or adjusted under 35 U.S.C. 154(b) by 268 days.

(21) Appl. No.: 18/248,057

(22) PCT Filed: Oct. 8, 2021

(86) PCT No.: PCT/CN2021/122630

§ 371 (c)(1),
(2) Date: Apr. 6, 2023

(87) PCT Pub. No.: WO2022/073478

PCT Pub. Date: Apr. 14, 2022

(65) Prior Publication Data

US 2023/0402052 A1 Dec. 14, 2023

(30) Foreign Application Priority Data

Oct. 9, 2020 (CN) ......................... 202011072173.6

(51) Int. Cl.
*G10L 19/022* (2013.01)
*G10L 21/04* (2013.01)
*G10L 25/45* (2013.01)

(52) U.S. Cl.
CPC .............. *G10L 21/04* (2013.01); *G10L 25/45* (2013.01); *G10L 19/022* (2013.01)

(58) Field of Classification Search
CPC ..................................................... G10L 19/022
See application file for complete search history.

(56) References Cited

U.S. PATENT DOCUMENTS 10,832,694 B2 * 11/2020 Helmrich .............. G10L 19/025
2009/0319283 A1 12/2009 Schnell et al.
(Continued)

FOREIGN PATENT DOCUMENTS

CN 103229235 A * 7/2013 ......... G10L 19/0212
CN 104112453 A 10/2014
(Continued)

OTHER PUBLICATIONS

Tom Backstrom, "Comparison of Windowing in Speech and Audio Coding," 2013 IEEE Workshop on Applications of Signal Processing to Audio and Acoustics (2013). (Year: 2013).*
(Continued)

*Primary Examiner* — Feng-Tzer Tzeng
(74) *Attorney, Agent, or Firm* — Junhe Law Office P.C.; Zhaohui Wang

(57) ABSTRACT

An audio signal processing method is disclosed. The method comprises: providing an input audio signal comprising a plurality of input data frames offset from each other by a predetermined frame shift and each input data frame having a predetermined frame length; performing first windowing process on the plurality of input data frames in sequence with a first window function; performing predetermined signal processing on the input audio signal after the first windowing processing, and generating an output audio signal; wherein the output audio signal has a plurality of output data frames each having the predetermined frame length corresponding to the plurality of input data frames of the input audio signal; performing second windowing processing on the plurality of output data frames in sequence with a second window function; and outputting the plurality
(Continued)

of output data frames after the second windowing processing by superimposing the plurality of output data frames with the predetermined frame shift.

19 Claims, 5 Drawing Sheets

(56) References Cited

U.S. PATENT DOCUMENTS

| | | | | |
|---|---|---|---|---|
| 2011/0173010 | A1* | 7/2011 | Lecomte | G10L 19/20 704/500 |
| 2017/0032803 | A1* | 2/2017 | Pandey | G10L 21/0208 |

FOREIGN PATENT DOCUMENTS

| | | | | | |
|---|---|---|---|---|---|
| CN | 111402917 | A | * | 7/2020 | G10L 25/45 |
| CN | 111699700 | A | | 9/2020 | |
| FR | 2915306 | A | | 10/2008 | |
| FR | 2915306 | A1 | * | 10/2008 | H03H 17/0266 |

OTHER PUBLICATIONS

Tom Backstrom, "Comparison of Windowing in Speech and Audio Coding," 2013 IEEE Workshop on Applications of Signal Processing to Audio and Acoustics (2013). (see attached reference in the previous Non-Final Office action) (Year: 2013).*

The First Office Action for the corresponding Chinese application No. 2020110721736, mailed on Sep. 23, 2023.

* cited by examiner

AUDIO SIGNAL PROCESSING METHOD, DEVICE AND STORAGE MEDIUM FOR REDUCING SIGNAL DELAY

TECHNICAL FIELD

The present disclosure relates to audio processing technology and, more specifically, to an audio signal processing method, a device, and a storage medium for reducing signal delay.

BACKGROUND OF THE INVENTION

In audio devices, signal delay during the processing of audio signals is undesired, especially for certain applications with high real-time requirements, such as hearing aid devices, where a total system delay from an audio input to an audio output is expected to be maintained below 10 milliseconds, and in any case, not greater than 20 milliseconds, otherwise the signal delay may have an impact on speech recognition. However, existing audio devices often struggle to meet the low delay requirements.

Therefore, it is desired to provide an audio signal processing method for audio devices to solve the problem of high delay in the existing technology.

SUMMARY OF THE INVENTION

An objective of the present application is to provide an audio signal processing method for reducing signal delay.

In one aspect of this application, an audio signal processing method is provided, The method comprises: providing an input audio signal comprising a plurality of input data frames offset from each other by a predetermined frame shift and each of the plurality of input data frames having a predetermined frame length; performing first windowing processing on the plurality of input data frames in sequence with a first window function, a start point and an end point of the first window function being aligned with two ends of each input data frame respectively; wherein the first window function comprises a starting function portion starting from a starting region of the first window function, an ending function portion in an ending region of the first window function and an intermediate function portion in an intermediate region of the first window function between the starting region and the ending region; and wherein the intermediate function portion has a first weighting factor, the starting function portion changes from 0 at the start point to the first weighting factor adjacent to the intermediate region, the ending function portion changes from the first weighting factor adjacent to the intermediate region to 0 at the end point; performing predetermined signal processing on the input audio signal after the first windowing processing and generating an output audio signal, wherein the output audio signal comprises a plurality of output data frames corresponding to the plurality of input data frames of the input audio signal, and each output data frame has the predetermined frame length; performing a second windowing processing on the plurality of output data frames in sequence with a second window function, a start point and an end point of the second window function being aligned with two ends of each output data frame respectively; wherein the second window function comprises a suppression function portion in a suppression region of the second window function, an output function portion in an output region of the second window function, and a compensation function portion in a compensation region of the second window function between the suppression region and the output region, wherein the output region has a length equal to that of the ending region; wherein the suppression function portion starts from 0 at the start point and for suppressing the output audio signal, the output function portion ends at 0 at the end point; and the compensation function portion is configured to provide signal weighting related to the output function portion and to compensate a difference in signal weighting between the ending function portion and the first weighting factor, and wherein the compensation function portion changes from the suppression function portion adjacent to the suppression region to the output function adjacent to the output region; and outputting the plurality of output data frames after the second windowing processing by superimposing the plurality of output data frames with the predetermined frame shift.

In other aspects of the present application, an audio signal processing device and a non-transitory computer storage medium are also provided.

The above is an overview of the application, which may be simplified, summarized and omitted in detail. Therefore, a person skilled in the art should realize that this part is only illustrative and is not intended to limit the scope of the application in any way. This summary is neither intended to determine the key features or essential features of the claimed subject matter, nor is it intended to be used as an auxiliary means to determine the scope of the claimed subject matter.

BRIEF DESCRIPTION OF DRAWINGS

The above and other features of the contents of the present application will be more fully understood by the following specification and the appended claims in conjunction with the drawings. It will be understood that these drawings depict only several embodiments of the contents of the present application and should not be considered as limiting the scope of the contents of the present application. By using the drawings, the contents of the present application will be illustrated more clearly and in more detail.

DETAILED DESCRIPTION OF THE INVENTION

Figure 1:
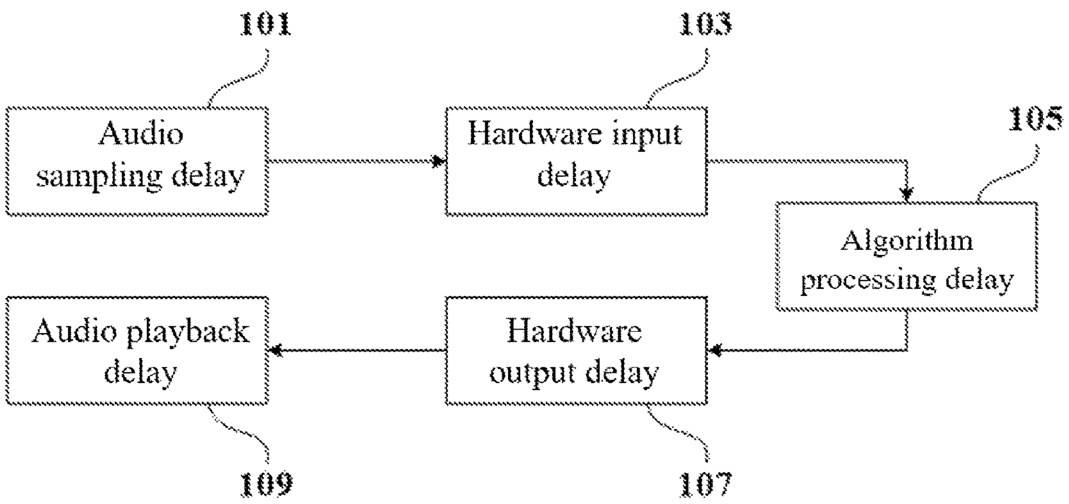
FIG. 1 illustrates a composition of signal delays in an audio signal processing path of an existing audio device.

In the following detailed description, reference is made to the drawings of which it forms part. In the drawings, similar reference number generally indicate similar components, unless the context indicates otherwise. The illustrative embodiments described in the detailed description, the drawings and the claims are not intended to be limiting. Other embodiments may be used, and other variations may be made without departing from the spirit or scope of the subject matter of the present application. It will be understood that a variety of different configurations, substitutions, combinations, designs, all of which clearly form part of the contents of this application, and all these clearly constitute a part of the content of the application.

FIG. 1 illustrates a composition of signal delays in an audio signal processing path of an existing audio device. The audio signal processing path of the existing audio device may include an audio sampling module, a signal processing module and an audio playback module whose processing on the audio signal may introduce various types of signal delays.

Specifically, the audio sampling module is used to sample the original audio signal in analogue form and generate corresponding audio data samples in digital format. Generally, the audio sampling module can sample the original audio signal at a predetermined sampling rate, e.g. 16 kHz, and can frame the audio data samples according to a predetermined frame length, e.g. 10 milliseconds, to generate a plurality of input data frames with a predetermined frame length. These successive plurality of input data frames constitute the input audio signal. Each input data frame may include a corresponding number of audio data samples. For example, each input data frame may have 160 audio data samples when the audio signal is sampled at a sampling rate of 16 kHz and the frame length is 10 milliseconds. It will be appreciated that in the preceding example the frame length is measured by a length of time, while in other cases the frame length may also be measured by the number of audio data samples, e.g., a frame length of 160 audio data samples or 256 audio data samples. It can be appreciated that the sampling rate of the audio data samples and the number of audio data samples per frame correspond to the frame length measured by the length of time.

The sampling of the original audio signal by the audio sampling module may introduce an audio sampling delay 101. For some existing audio devices, the audio sampling module may not proceed with sampling the original audio signal and generating a next input data frame until an input data frame is generated. This means that every two adjacent input data frames do not overlap with each other, so the audio sampling delay 101 introduced by the audio sampling module may be equal to the frame length of the input data frames. In addition, a hardware input delay 103 may be introduced during the audio sampling process, which depends on the delay in the analog-to-digital signal conversion, which is typically 1 to 2 milliseconds. After this, the input audio signal generated by the sampling module may be sent to the signal processing module that processes the input audio signal based on a predetermined signal processing algorithm. The signal processing module may introduce an algorithmic processing delay 105, which is typically proportional to the frame length, for example 0.2 to 0.5 times the frame length. The output audio signal may have the same frame length as the input audio signal. For example, the output audio signal may include a plurality of output data frames that all have a predetermined frame length. The output audio signal may be sent to the audio playback module and be played back by the audio playback module for listening by a user of the audio device. During this process, the audio playback module may introduce a hardware output delay 107 and an audio playback delay 109. Like the hardware input delay 103, the hardware output delay 107 depends primarily on the digital-to-analog signal conversion, which is typically 1 to 2 milliseconds. In the existing audio device, the audio playback module plays and processes the output audio signal in a unit of output data frames, that is, the audio playback module may play an output data frame after receiving the entire output data frame. Thus, the audio playback delay 109 is also equal to the frame length of the output data frames. In general, the frame length of the data frames is at least 20 milliseconds to meet the requirement of subsequent spectrum analysis and processing.

It can be seen that audio sampling delay 101 and the audio playback delay 109, which depend on the frame length of the data frames, have the most significant influence on the total signal delay during the audio signal processing by the existing audio device shown in FIG. 1. If the total signal delay needs to be reduced, both of the two types of signal delays should be reduced.

In order to solve the problem of high signal latency in existing audio devices, the methods of the embodiments of the present application intercept audio data samples in a manner that some of the data samples are reused during the framing of audio sampling, i.e., the adjacent data frames may overlap with each other with frame shifts between different data frames. Correspondingly, during audio playback, adjacent data frames are offset with the same frame shift. This reduces the scale of the audio sampling delay and audio playback delay from the data frame length to the size of the frame shift, thus significantly reducing the total signal delay of the audio signal processing path. In addition, in the embodiments of the present application, windowing processing to the data frames with a specially designed window function is performed, which effectively preserves in the output audio signals the information of the original audio signals and thus enables the playback of the output audio signals with a better reproduction of the original audio signals.

Figure 2:
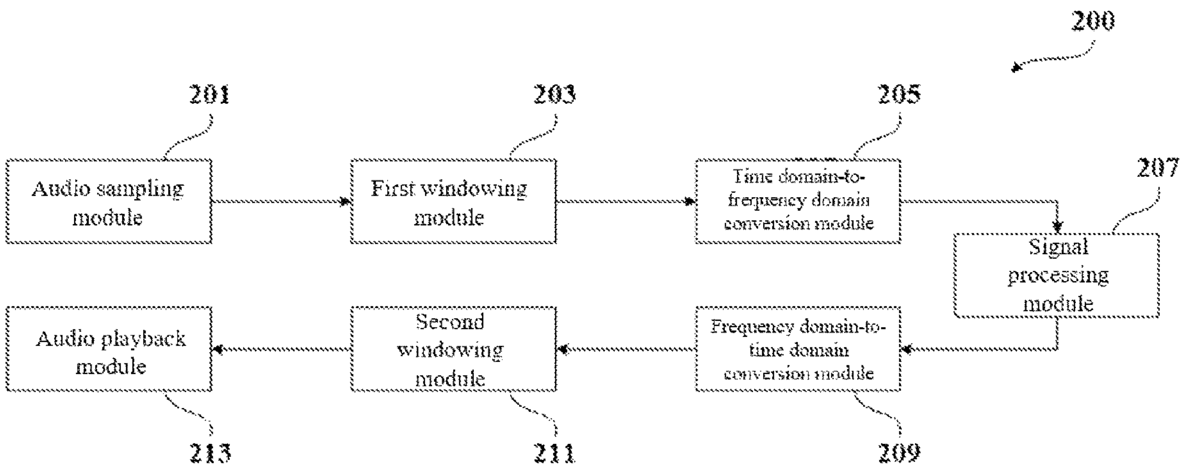
FIG. 2 illustrates a schematic diagram of an audio device according to an embodiment of the present application.

FIG. 2 illustrates a schematic diagram of an audio device 200 according to an embodiment of the present application. In an example, the audio device may be a hearing aid, and in other examples, the audio device may be a wireless headset (e.g. a wireless headset with Bluetooth transmission protocol), a speaker or other wired or wireless audio devices.

As shown in FIG. 2, the audio device 200 includes an audio sampling module 201 which is used to sample an original audio signal and generate audio data samples in a corresponding digital format. The audio sampling module 201 is also used to sub-frame the generated audio data samples with a predetermined frame shift, thereby generating an input audio signal containing a plurality of input data frames. In the input audio signal, there is a predetermined frame shift between the start positions of two adjacent input data frames, and the size of the predetermined frame shift is smaller than a frame length of the input data frames. In some embodiments, each input data frame may include N segments of the equal length, where N is an integer not less than 2; the size of the frame shift may be equal to 1/N of the frame length. After each interval equal to the frame shift, a new input data frame can be provided for subsequent processing, and therefore the audio sampling delay is substantially reduced to a size same as the frame shift. In some other embodiments, the frame shift may alternatively be of a length of a plurality of segments, for example, 2, 3 or more of segments.

The audio device 200 also includes a first windowing module 203, which is used to sequentially perform first windowing process on a plurality of input data frames of the input audio signal using a first window function. Another advantage of using input data frames that overlap with each other by a frame shift is that a relatively stable signal can be obtained, which is advantageous for audio signals that require windowing processing. The windowing processing can reduce spectral leakage during the signal processing of time domain-to-frequency domain conversion and frequency domain-to-time domain conversion which is needed for frequency domain signal processing.

As shown in FIG. 2, the audio device 200 also includes a time domain-to-frequency domain conversion module 205, a signal processing module 207 and a frequency domain-to-time domain conversion module 209. These modules 205, 207 and 209 sequentially process the input audio signal after the first windowing processing. Specifically, the signal processing algorithm implemented by the signal processing module 207 is usually a frequency domain signal processing algorithm but the input audio signal is a time domain signal, and therefore, the time domain-to-frequency domain conversion module 205 before the signal processing module 207 may perform time domain-to-frequency domain signal conversion on the input audio signal in advance. After being processed, the frequency domain-to-time domain conversion module 209 after the signal processing module 207 then performs frequency domain-to-time domain conversion on the signal, thereby generating an output audio signal in time domain. Similar to the input audio signal, in some embodiments, the output audio signal also includes a plurality of output data frames corresponding to the plurality of input data frames of the input audio signal, and these output data frames are mutually offset by a predetermined frame shift and have the same predetermined frame length as the input data frame.

The audio device 200 also includes a second windowing module 211, which is used to sequentially perform the second windowing processing on the plurality of output data frames of the output audio signal using a second window function. Further details of the second windowing processing and the first windowing processing performed by the first windowing module 203 are described in further details below in conjunction with examples.

After being processed by the second windowing module 211, the output audio signal may be sent to the audio playback module 213 and be played back by it to a user of the audio device 200 for listening. It can be understood that in the output audio signal, there is a predetermined frame shift between the start positions of two adjacent output data frames, and the size of the predetermined frame shift is less than the frame length. In some embodiments, each output data frame may include N segments, where N is an integer not less than 2, and the size of the frame shift may be equal to 1/N of the frame length. Since a new output data frame is provided to the audio playback module 213 after each interval equal to the frame shift, the audio playback delay is substantially reduced to a size same as the frame shift. For example, if the frame shift is 1/N of the frame length, the audio playback delay can be reduced to 1/N of the frame length.

Figure 3:
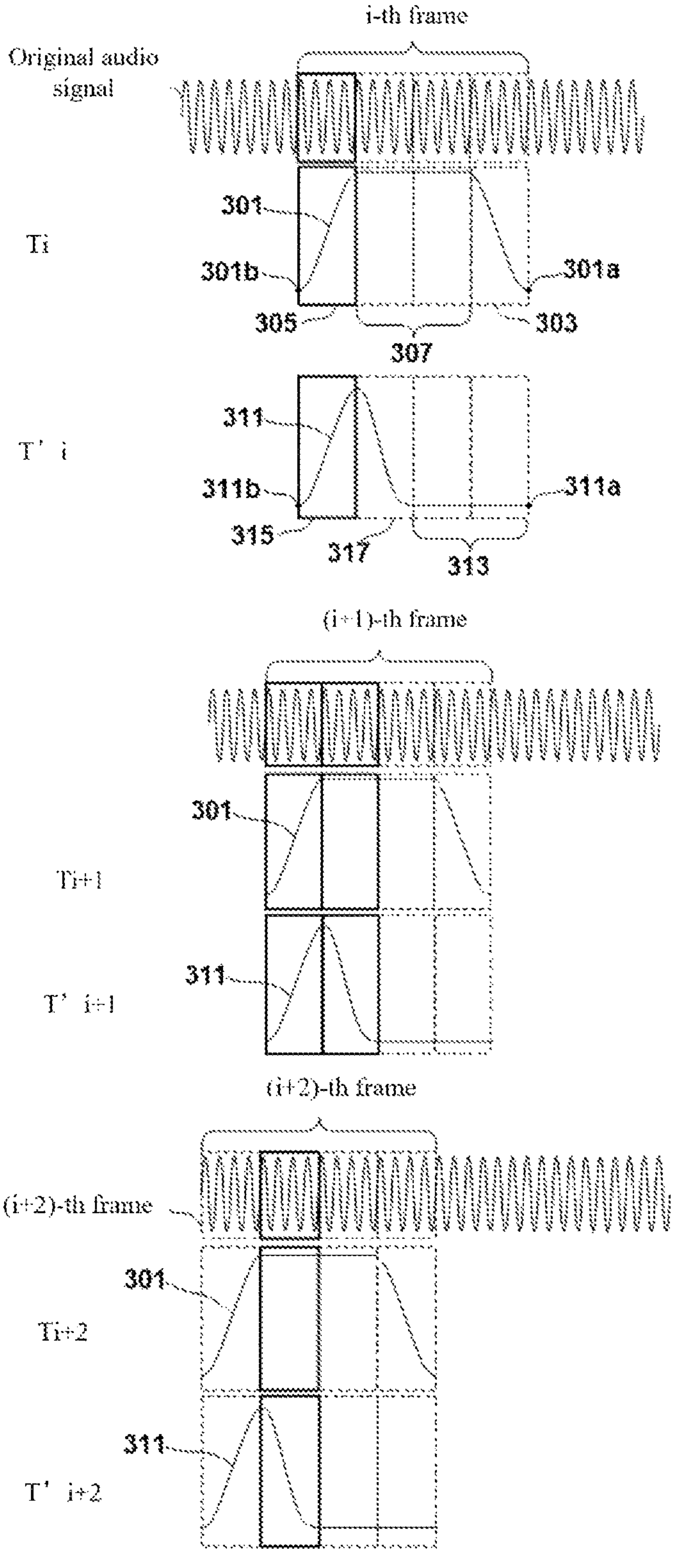
FIG. 3 illustrates the exemplary processing of an audio signal according to an embodiment of the present application.

FIG. 3 illustrates the exemplary processing of an audio signal in accordance with an embodiment of the present application.

As shown in FIG. 3, an original audio signal can be sampled by the signal sampling module and a plurality of input data frames (the data points included in each input data frame are not shown in FIG. 3) can be generated offset from each other by a predetermined frame shift. For example, the input data frame may include an i-th input data frame, an (i+1)-th input data frame, an (i+2)-th input data frames as shown in FIG. 3, where i is a positive integer. In the example of FIG. 3, each of the three input data frames consists of four equal-length segments, which are offset from each other by the length of one segment, that is, ¼ of the frame length of the input data frame. It should be noted that in practice, the number of segments included in an input data frame, and the frame shift between two adjacent input data frames can be adjusted according to actual needs.

For the plurality of input data frames included in the input audio signal, the first windowing module may sequentially perform the first windowing processing using the first window function. Referring to FIG. 3, the first window function 301 has a start point 301*a* and an end point 301*b*, which are respectively aligned with two ends of each input data frame. For example, at Ti, the two ends of the first window function 301 are respectively aligned with the two ends of the i-th input data frame to perform the windowing processing; at Ti+1, the two ends of the first window function 301 are respectively aligned with the two ends of the (i+1)-th input data frame to perform the windowing processing; at Ti+2, the two ends of the first window function 301 are respectively aligned with the two ends of the (i+2)-th input data frame to perform the windowing processing.

In the embodiment shown in FIG. 3, the window corresponding to the first window function 301 may be divided into a starting region 303 starting at the start point 301*a*, an ending region 305 ending at the end point 301*b*, and an intermediate region 307 located between the starting region 303 and the ending region 305. The first window function 301 has a constant first weighting factor within the intermediate region 307. The first window function 301 also has a starting function portion in the starting region 303, which changes from 0 at the start point 301*a* to the first weighting factor adjacent to the intermediate region 307. The first window function 301 further has an ending function portion in the ending region 305, which changes from the first weighting factor adjacent to the intermediate region 307 to 0 at the end point 301*b*.

The values of the first window function 301 at the start point 301*a* and the end point 301*b* are both zero, which can effectively suppress spectrum leakage. The first weighting factor in the intermediate region 307 determines audio information that can be retained in the input data frame after the first windowing processing. In some embodiments, the first weighting factor may be 1, that is, the audio information of each input data frame aligned with the intermediate area 307 is not attenuated during the first windowing processing. In some other embodiments, the first weighting factor may also be of another value, e.g. a value ranging from 0.5 to 1. In practical applications, the intermediate region 307 may be as extended as possible. In the example shown in FIG. 3, the length of the intermediate region 307 is two segments of the input data frame, while the length of the starting region 303 and the ending region 305 are both one segment of the input data frame. In some preferred examples, for example, when the input data frame has 8 segments, the length of the intermediate region may be 6 segments of the input data frame, while the length of the starting region 303 and the ending region 305 both one segment of the input data frame. For another example, when the input data frame has 16 segments, the length of the intermediate region 307 may be 14 segments of the input data frame, while the length of the starting region 303 and the ending region 305 are both one segment of the input data frame. It will be appreciated that in some other examples, the starting region 303 and ending region 305 may also have other lengths, respectively. For example, when the input data frame has 16 segments, the intermediate region 307 may have a length of 12 segments of the input data frame, while starting region 303 and ending region 305 may respectively have a length of two segments of the input data frame.

As mentioned above, the start function portion in the starting region 303 varies from 0 at start point 301*a* to the first weighting factor (e.g., 1) at a position which is adjacent to the intermediate region 307, while the ending function portion in the ending region 305 varies from the first weighting factor (e.g., 1) in another position which is adjacent to the intermediate region 307 to 0 at the end point 301*b*. The starting function portion and the ending function portion may have a profile which is identical or similar to that of some existing window functions. In the embodiment shown in FIG. 3, the starting function portion may fit a function portion of a starting half of a Hanning window function, while the end function portion may fit a function portion of an ending half of the Hanning window function. In other words, the first window function has the additional intermediate region to provide a higher first weighting factor than the existing Hanning window function to retain as much of the audio information in the input data frame as possible.

After the sequentially windowing processing on the input data frames, these input data frames can be time domain-to-frequency domain conversed and then be processed in frequency domain. The signal resulting from the frequency domain signal processing can be an output audio signal having a plurality of output data frames, after a further frequency domain-to-time domain conversion. The second windowing module may perform second windowing processing on these output data frames in sequence using a second window function. Referring to FIG. 3, the second window function 311 has a start point 311*a* and an point 311*b*, which are respectively aligned with two ends of each output data frame. For example, at T'i, the two ends of the second window function 311 are respectively aligned with two ends of an i-th output data frame for windowing processing; at T'i+1, the two ends of the second window function 311 are respectively aligned with two ends of an (i+1)-th output data frame for windowing processing; at T'i+2, the two ends of the second window function 311 are respectively aligned with the two ends of an (i+2)-th output data frame for windowing processing. It should be noted that in the example shown in FIG. 3, waveforms of the i-th, (i+1)-th and (i+2)-th output data frames are not shown, and thus the second windowing processing is illustratively as being aligned with the i-th, (i+1)-th and (i+2)-th input data frames. However, it can be understood by a person skilled in the art that after the windowing processing, each output data frame may have different information and different waveforms from the corresponding input data frame.

The window corresponding to the second window function 311 may be divided into a suppression region 313 starting at a start point 311*a*, an output region 315 ending at a point 311*b*, and a compensation region 317 located between the suppression region 313 and the output region 315. The suppression region 313 has a suppression function portion for suppressing the data output in the output data frames aligned with this region. In some embodiments, the suppression function portion may be set to equal to 0 over the entire length of the suppression region 313. In other words, data in the output data frame aligned to the suppression region 313 may not be sent to the audio playback module and thus not played back to the user of the audio device after second windowing processing. In some other embodiments, the suppression function portion may also have other function curves, which generally vary substantially from 0 at the start point 311*a* to a certain weighting value, for example a value less than 1. It will be understood that since the suppression function portion is used to suppress data output, the length of the suppression region is generally complementary to the length of the output data frame expected to be output from the audio device. In the example shown in FIG. 3 where each output data frame includes 4 equal-length segments, the output region 315 and the compensation region 317 each occupies one segment, so the length of the suppression region 313 is equal to two segments.

The length of the output region 315 is equal to the length of the ending region 303 of the first window function 301, so that the processing of the output data frame by the second window function 311 at the output region 315 corresponds substantially to the processing of the input data frame by the first window function at the ending region 303. Accordingly, the second window function 311 has an output function portion located in the output region 315 which changes from the compensation function portion at a position adjacent to the compensation region 317 to 0 at the end point 311*b*. The second window function 311 also has a compensation function portion located in the compensation region 317 which is used to provide signal weighting associated with the output function portion and to compensate for a difference in signal weighting between the ending function portion and the first weighting factor, which changes from the suppression function portion at a position adjacent to the suppression region 313 to the output function portion at another position adjacent to the output region 315. For example, the compensation function portion is a quotient of the product of the ending function portion and the output function portion divided by the first weighting factor. In the case where the first weighting factor is equal to 1, the compensation function portion is the product of the ending function portion in the end region 303 and the output function portion. Specifically, as can be shown in FIG. 3, the output data frames subjected to the second windowing process are superimposed with a predetermined frame shift and then output. Therefore, the fourth segment of the i-th output data frame and the third segment of the (i+1)-th output data frame are superimposed with each other with the predetermined frame shift and output. However, during the two times of windowing processing, the fourth segment of the i-th input data frame and the i-th output data frame are processed with the ending function portion and the output function portion, respectively, while the third segment of the (i+1)-th input data frame is weighted with the first weighting factor in the intermediate region during the first windowing processing (when the weighting factor is 1, such processing corresponds to no attenuation). Accordingly, in the second windowing processing, the product of the ending function portion and the output function part may be divided by the first weighting factor to process the third segment of the (i+1)-th output data frame. From the perspective of the entire signal processing, this processing method enables the two segments to be superimposed with each other can be processed with the same weighting function, thereby compensating for the inconsistency of the signal weighting processing during the previous first windowing processing. Similarly, the fourth segment of the (i+1)-th output data frame and the third segment of the (i+2)-th output data frame are superimposed and output; in the second windowing processing, the third segment of the (i+2)-th output data frame is processed using the product of the ending function portion and the output function portion. In this way the third segment of the (i+1)-th output data frame and the fourth segment of the (i+1)-th output data frame which are to be superimposed with each other and output can be processed with the same weighting function.

It should be noted that when being output, each segment of the output data frame may correspond to the segments in the adjacent output data frames during the superimposition operation, and therefore, these segments are superimposed and output during the superimposition operation. For example, the third segment of the (i+2)-th output data frame corresponds to the fourth segment of the (i+1)-th output data frame in FIG. 3. However, the audio playback device may generally play an output audio signal with a predetermined frame length, and therefore, in some embodiments, the plurality of output data frames that are superimposed with each other and further output after the second windowing processing may maintain the predetermined frame length, e.g. having the length of four segments as shown in FIG. 3. Therefore, two adjacent output data frames may not be output in their entirety when being output, rather, only a portion of the output data frames which are aligned with the output time window (which has a predetermined frame length) may be output. Still referring to FIG. 3, at T'i+1, the output time window can be aligned to the i-th output data frame, so that the third and fourth segments of i-th output data frame can be output after the second windowing processing, and the third segment of the (i+1)-th output data frame is included in the output time window, so it is also output after the second windowing processing. At the meantime, the output data frame of the (i+2)-th frame which also falls into the output time window is suppressed after the second windowing processing, as well as the first segment of the (i+3)-th output data frame (not shown). Therefore, at this time, the output audio signal that is actually output after the second windowing processing only includes the third and fourth segments of the i-th output data frame (processed by the second windowing) and the third segment of the (i+1)-th output data frame (processed by the second windowing). The output signal may have similar composition at other moments and thus are not repeated herein.

It will be appreciated that the reason why the superimposed output of the output data frames shown in FIG. 3 outputs only three segments of two adjacent output data frames is because the suppression region (with a weighting factor of 0) occupies a length of two of the four segments (frame lengths) in the second windowing processing. In some other embodiments, depending on the frame length, the number of sub-frames of each output data frame and the curve/weighting factor of the suppression function portion in the suppression function region, the composition of the resulting output signal may change, as can be determined by a person skilled in the art.

greater than 2 data points in length, otherwise the frame length/N may not be an integer, which would make it impossible to split the data points. Specifically, when N is equal to the frame length, the first two data points and the last two data points of the data frame processed by the first window function are 0-1 mutations, which makes it impossible for the window function to have the effect of suppressing spectrum leakage as it should, and the second window function is zero. When N is equal to half of the frame length, the second window function in the process of superimposing adjacent output data frames retains only the first segment after the former processing and the second segment after the latter processing, without solving the problem of smooth transition between data frames. Only when the frame length/N>=3, the length of the data frames can satisfy the requirement of smooth transition between data frames.

Figure 4A:
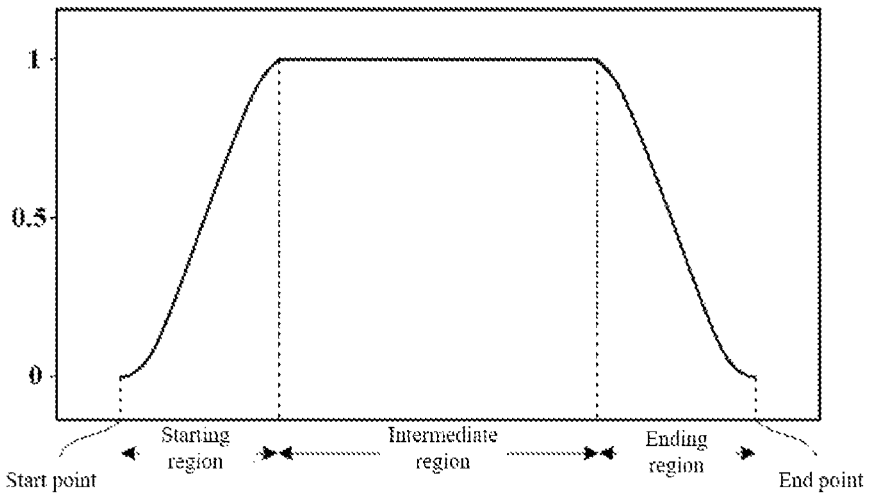
FIGS. 4*a* and 4*b* illustrate enlarged views of a first window function and a second window function shown in FIG. 3, respectively.
Figure 4B:
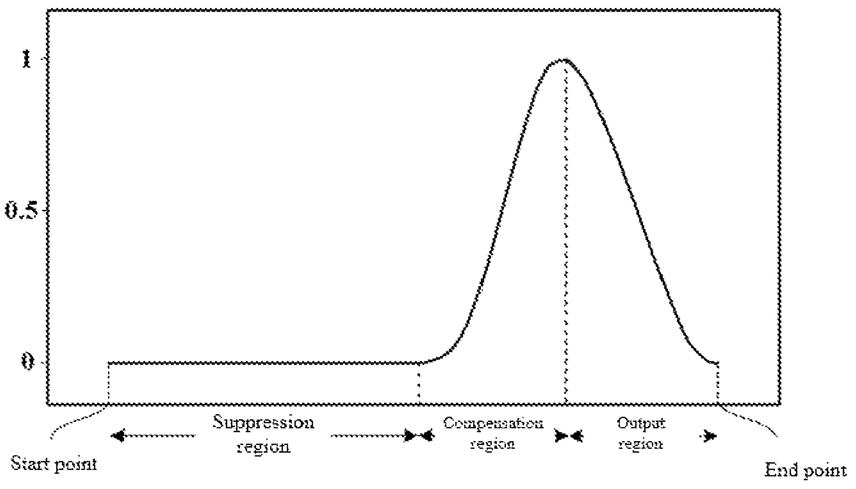

FIGS. 4*a* and 4*b* illustrate enlarged schematic views of the first window function and the second window function shown in FIG. 3. As shown in FIG. 4*a*, the starting function portion in the starting region fits the function portion of the starting half of the Hanning window function, the ending function in the ending region fits the function portion of the ending half of the Hanning window function. The weighting factor is 1 everywhere in the intermediate region. As shown in FIG. 4*b*, the weighting function is 0 in the suppression region, the output function portion in the output region fits the function portion of the ending half of the Hanning window function portion, while the compensation function within the compensation region is the product of the function part of the ending half of the Hanning window function.

Thus, assuming that the length of both the starting and ending regions is equal to L/N, where L is the length of an input data frame or an output data frame and N is a positive integer greater than 2, then the first window function w1(n) in FIG. 4*a* can be expressed by the following expression.

$$w1 = \begin{cases} 0.5\left[1-\cos\left(\dfrac{2\pi n}{\frac{2L}{N}+1}\right)\right], & 1 \le n \le \dfrac{L}{N} \text{ (starting region)} \\ 1, & \dfrac{L}{N} < n \le \dfrac{L(N-1)}{N} \text{ (\textit{intermedate} region)} \\ 0.5\left[1-\cos\left(\dfrac{2\pi(n-L)}{\frac{2L}{N}+1}\right)\right], & \dfrac{L(N-1)}{N} < n \le L \text{ (ending region)} \end{cases}$$

The second window function w2(n) in FIG. 4*b* can be expressed by the following expression:

$$w2n = \begin{cases} 0, & 0 \le n \le \dfrac{(N-2)L}{N} \text{ (suppression region)} \\ 0.25\left[1-\cos\left(\dfrac{2\pi\left(n-\frac{(N-2)L}{N}\right)}{\frac{2L}{N}+1}\right)\right]^2, & \dfrac{(N-2)L}{N} < n \le L \text{ (compensation region)} \\ 0.25\left[1-\cos\left(\dfrac{2\pi(n-(N-L))}{\frac{2L}{N}+1}\right)\right], & \dfrac{L(N-1)}{N} < n \le L \text{ (output region)} \end{cases}$$

Figure 5A:
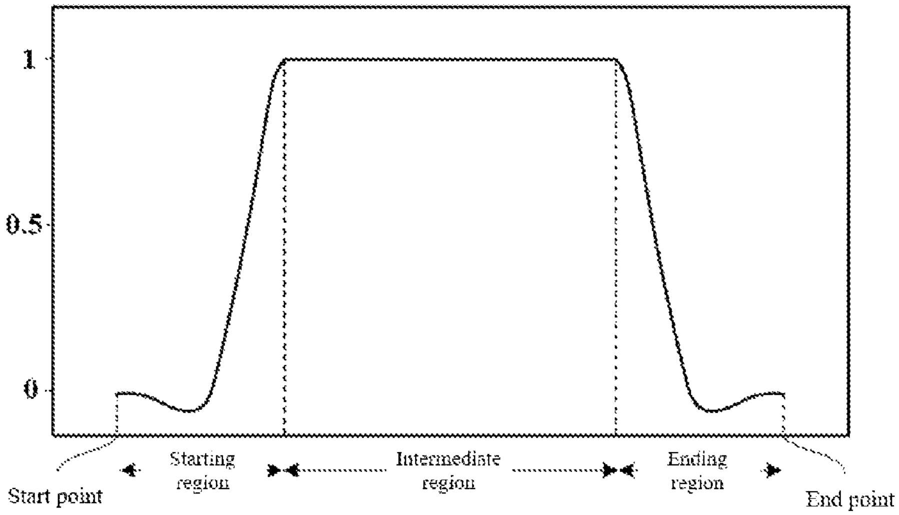
FIGS. 5*a* and 5*b* illustrate other examples of a first window function and a second window function according to an embodiment of the present application.
Figure 5B:
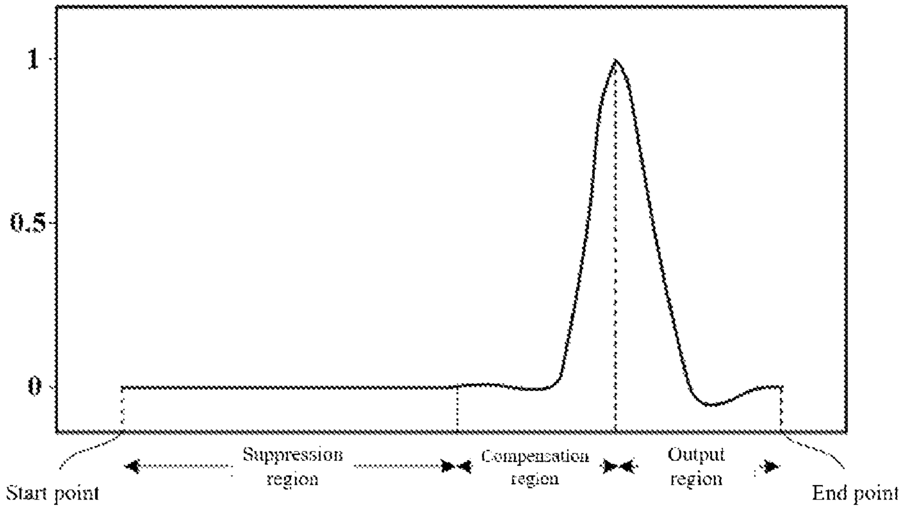

In the example shown in FIG. 3, N is set as 4. In other examples, N can be a positive integer not less than 2. It should be note that a maximum value of N should be less than half of the frame length, that is, each segment should be FIGS. 5*a* and 5*b* illustrate further examples of a first window function and a second window function according to an embodiment of the present application. As shown in FIG. 5*a*, the starting function portion in the starting region fits the function portion of the starting half of a flat-topped window function, the ending function in the ending region fits the function portion of the ending half of the flat-topped window function; and the weighting factor in the intermediate region is 1. As shown in FIG. 5*b*, the weighting function in the suppression region is equal to 0, the output function portion in the output region fits the function portion of the ending half of the flat-topped window function, and the compensation function in the compensation region is the function portion of the ending half of the flat-topped window function, and the compensation function within the compensation region is the product of the function part of the ending half of the flat-topped window function.

Thus, the first window function w1'(n) in FIG. 5*a* can be expressed by the following expression.

$$
w1'(n) = \begin{cases} a_0 - \alpha_1 \cos\left(\dfrac{2\pi n}{\frac{2L}{N} - 1}\right) + \alpha_2 \cos\left(\dfrac{4\pi n}{\frac{2L}{N} - 1}\right) - a_3 \cos\left(\dfrac{6\pi n}{\frac{2L}{N} - 1}\right) + a_4 \cos\left(\dfrac{8\pi n}{\frac{2L}{N} - 1}\right), 0 \le n \le \dfrac{L}{N} \\ 1, \dfrac{L}{n} < n \le \dfrac{L(N-1)}{N} \\ a_0 - \alpha_1 \cos\left(\dfrac{2\pi(L-n)}{\frac{2L}{N} - 1}\right) + \alpha_2 \cos\left(\dfrac{4\pi(L-n)}{\frac{2L}{N} - 1}\right) - a_3 \cos\left(\dfrac{6\pi(L-n)}{\frac{2L}{N} - 1}\right) + a_4 \cos\left(\dfrac{8\pi(L-n)}{\frac{2L}{N} - 1}\right), \end{cases}
$$

where $a_0 = 1$, $a_1 = 1.93$, $a_2 = 1.29$, $a_3 = 0.388$, $a_4 = 0.032$.

The second window function w2'(n) in FIG. 5*b* can be expressed by the following expression $$
w2'(n) = \begin{cases} 0, 0 \le n \le \dfrac{L(N-2)}{N} \\ \left(a_0 - a_1 \cos\left(\dfrac{2\pi\left(n - \frac{L(N-2)}{N}\right)}{\frac{2L}{N} - 1}\right) + a_2 \cos\left(\dfrac{4\pi\left(n - \frac{L(N-2)}{N}\right)}{\frac{2L}{N} - 1}\right) - a_3 \cos\left(\dfrac{6\pi\left(n - \frac{L(N-2)}{N}\right)}{\frac{2L}{N} - 1}\right) + a_4 \cos\left(\dfrac{8\pi\left(n - \frac{L(N-2)}{N}\right)}{\frac{2L}{N} - 1}\right)\right)^2, \\ \dfrac{L(N-2)}{N} < n \le \dfrac{L(N-1)}{N} \\ a_0 - a_1 \cos\left(\dfrac{2\pi(L-N)}{\frac{2L}{N} - 1}\right) + a_2 \cos\left(\dfrac{4\pi(L-N)}{\frac{2L}{N} - 1}\right) - a_3 \cos\left(\dfrac{6\pi(L-N)}{\frac{2L}{N} - 1}\right) + a_4 \cos\left(\dfrac{8\pi(L-N)}{\frac{2L}{N} - 1}\right), \\ \dfrac{L(N-1)}{N} \le n \le L \end{cases}
$$

where $a_0 = 1$, $a_1 = 1.93$, $a_2 = 1.29$, $a_3 = 0.388$, $a_4 = 0.032$.

It will be appreciated that FIGS. 4*a*-4*b* and FIGS. 5*a*-5*b* illustrate only exemplarily the profiles of the window functions, and in particular the profiles that may be eligible for the starting function portion, ending function portion and the output function portion. A person skilled in the art can adjust the profiles of these portions according to actual application requirements, and the compensation function portion can be adjusted according to the profiles of the other portions.

It should be noted that in the above embodiments of the present application, the input data frame and the output data frame both include N equal-length segments for purpose of description, and the frame shift between adjacent data frames is equal to the length of one segment. In some other embodiments, the input data frame and the output data frame may have the same or a different number of segments, for example the input data frame may have M segments and the output data frame may have N segments, where M and N are positive integers greater than 2, and M may be equal to N or not equal to N. In some embodiments, at least a portion of the M segments may have unequal lengths, and/or at least a portion of the N segments may have unequal lengths. Furthermore, the frame shifts between adjacent input data frames as well as adjacent output data frames should be equal to each other, which enables the processing of the output data frames using the compensation function portion of the second window function, in order to compensate for the difference in signal weighting between the ending function portion of the first window function and the first weighting factor. For example, the frame shift should be equal to the length of the last input segment out of the M segments of the input data frame, and should be equal to the length of the last output segment out of the N segments of the output data frame.

Figure 6:
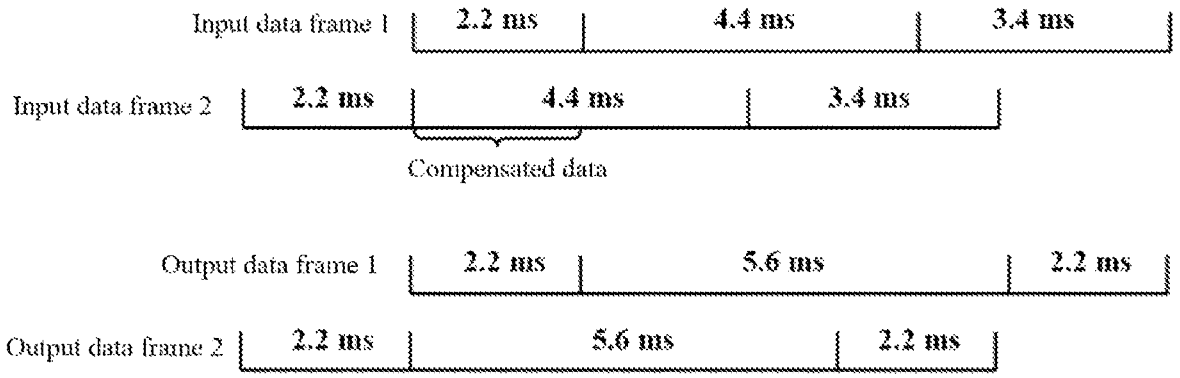
FIG. 6 illustrates an example of input data frames and output data frames having segments with unequal lengths.

FIG. 6 illustrates an example of an input data frame and an output data frame having segments of unequal lengths. As shown in FIG. 6, the frame lengths of the input data frame and the output data frame are both 10 milliseconds. And input data frames 1 and 2 have three segments of length which are 2.2 milliseconds, 4.4 milliseconds and 3.4 milliseconds respectively, with a frame shift of 2.2 milliseconds therebetween. That is, the frame shift of 2.2 milliseconds is equal to the length of the last input segment. And input data frames 1 and 2 have three segments of lengths which are 2.2 milliseconds, 4.4 milliseconds and 3.4 milliseconds respectively, and the frame shift between these two adjacent frames is 2.2 milliseconds, which is equal to the length of the last input segment. The output data frames 1 and 2 have three segments of length 2.2 milliseconds, 5.6 milliseconds and 2.2 milliseconds respectively, and the frame shift between two adjacent frames is 2.2 milliseconds. That is, the frame shift of 2.2 milliseconds is equal to the length of the last output segment. Similar to the examples shown in FIGS. 3 and 4, the compensation region of the second window function which is to be aligned with the second segment in each output data frame may have a compensation function portion that compensates for the difference in signal weighting between the ending function portion of the first window function and the first weighting factor in the second segment of input data frame 2 during the first windowing processing, i.e., the compensated data of 2.2 milliseconds length. It will be appreciated by a person skilled in the art that the example shown in FIG. 6 is merely illustrative and that in practice the specific function curves for the first window function and second window function can be designed according to the frame shift, segmentation and other factors of the data frames.

In some embodiments, the present application also provides several computer program products having a non-transitory computer-readable storage medium. The non-transitory computer-readable storage medium includes computer-executable instructions for performing the steps in the method embodiment as shown in FIG. 3. In some embodiments, the computer program product may be stored in a hardware device, such as an audio signal processing device.

Embodiments of the invention can be implemented by hardware, software or a combination of software and hardware. The hardware part may be implemented using dedicated logic; the software part may be stored in memory and executed by an appropriate instruction execution system, such as a microprocessor or dedicated designed hardware. A person skill in the art will appreciate that the devices and methods described above can be implemented using computer-executable instructions and/or included in processor control codes, such as those provided on a carrier medium such as a disk, CD or DVD-ROM, a programmable memory such as a read-only memory (firmware) or a data carrier such as an optical or electronic signal carrier. The devices and its modules of the present invention can be implemented by hardware circuits such as ultra-large scale integrated circuits or gate arrays, semiconductors such as logic chips, transistors, etc., or programmable hardware devices such as field programmable gate arrays, programmable logic devices, or by software executed by various types of processors, or by a combination of the above hardware circuits and software such as firmware.

It should be noted that although several steps or modules of the audio signal processing method, device and storage medium are mentioned in the above detailed description, this division is only exemplary and not mandatory. In fact, according to embodiments of the present application, features and functions of two or more modules described above may be specified in a single module. Conversely, the features and functions of one module described above may be further divided to be specified by a plurality of modules.

Other variations to the disclosed embodiments can be understood and implemented by a person of skilled in the art by studying the specification, the disclosure. the drawings and appended claims thereto. In the claims, the word "comprising" does not exclude other elements and steps, and the words "one" and "a" do not exclude the plural. In the practical application of this application, a single part may perform the functions of more than one technical feature cited in the claims. Any reference number in the claims should not be construed as limiting the scope.

The invention claimed is:

1. An audio signal processing method implemented by an audio device, the method comprising:

sampling, by a processor of the audio device, an original audio signal to generate audio data samples;

sub-framing, by the processor, the audio data samples to generate an input audio signal comprising a plurality of input data frames offset from each other by a predetermined frame shift and each of the plurality of input data frames having a predetermined frame length;

performing, by the processor, first windowing processing on the plurality of input data frames in sequence with a first window function, a start point and an end point of the first window function being aligned with two ends of each input data frame respectively; wherein the first window function comprises a starting function portion starting from a starting region of the first window function, an ending function portion in an ending region of the first window function and an intermediate function portion in an intermediate region of the first window function between the starting region and the ending region; and wherein the intermediate function portion has a first weighting factor, the starting function portion changes from 0 at the start point to the first weighting factor adjacent to the intermediate region, the ending function portion changes from the first weighting factor adjacent to the intermediate region to 0 at the end point;

performing, by the processor, predetermined signal processing on the input audio signal after the first windowing processing and generating an output audio signal, wherein the output audio signal comprises a plurality of output data frames corresponding to the plurality of input data frames of the input audio signal, and each output data frame has the predetermined frame length;

performing, by the processor, a second windowing processing on the plurality of output data frames in sequence with a second window function, a start point and an end point of the second window function being aligned with two ends of each output data frame respectively; wherein the second window function comprises a suppression function portion in a suppression region of the second window function, an output function portion in an output region of the second window function, and a compensation function portion in a compensation region of the second window function between the suppression region and the output region, wherein the output region has a length equal to that of the ending region; wherein the suppression function portion starts from 0 at the start point and for suppressing the output audio signal, the output function portion ends at 0 at the end point; and the compensation function portion is configured to provide signal weighting related to the output function portion and to compensate a difference in signal weighting between the ending function portion and the first weighting factor, and wherein the compensation function portion changes from the suppression function portion adjacent to the suppression region to the output function adjacent to the output region; and outputting the plurality of output data frames after the second windowing processing by superimposing the plurality of output data frames with the predetermined frame shift to an audio playback module of the audio device for playing back the output audio signal.

2. The audio signal processing method of claim 1, wherein each input data frame and each output data frame comprise N segments respectively, and wherein N is an integer not less than 2.

3. The audio signal processing method of claim 2, wherein the N segments have an equal length, and the predetermined frame shift is equal to the length of the segments.

4. The audio signal processing method of claim 3, wherein all of the starting region, the ending region, the compensation region, and the output region have a length equal to a segment.

5. The audio signal processing method of claim 4, wherein the suppression region has a length equal to one or more segments.

6. The audio signal processing method of claim 4, wherein the intermediate region has a length equal to one or more segments.

7. The audio signal processing method of claim 1, wherein the first weighting factor is equal to or less than 1.

8. The audio signal processing method of claim 7, wherein the compensation function portion has a value that is equal to a product of the ending function portion and the output function portion divided by the first weighting factor.

9. The audio signal processing method of claim 1, wherein each input data frame comprises M segments and each output data frame comprises N segments, where M and N are integers not less than 2, at least a part of the M segments have unequal lengths, at least a part of the N segments have unequal lengths, and the predetermined frame shift is equal to a length of a last input segment of the M segments of the input data frame and equal to a length of the last output segment of the N segments of the output data frame.

10. The audio signal processing method of claim 9, wherein M and N are not equal to each other.

11. The audio signal processing method of claim 1, wherein the suppression function portion remains 0 in the suppression region.

12. The audio signal processing method of claim 1, wherein the starting function portion of the first window function fits a function portion of a starting half of a Hanning window function, and the ending function portion of the first window function fits a function portion of an ending half of the Hanning window function.

13. The audio signal processing method of claim 12, wherein the output function portion of the second window function fits the function portion of the ending half of the Hanning window function.

14. The audio signal processing method of claim 1, wherein the starting function portion of the first window function fits a function portion of a starting half of a flat-top window function, and the ending function portion of the first window function fits a function portion of an ending half of the flat-top window function.

15. The audio signal processing method of claim 14, wherein the output function portion of the second window function fits a function portion of an ending half of a flat-top window function.

16. The audio signal processing method of claim 1, wherein the output function portion of the second window function is the same as the ending function portion of the first window function.

17. The audio signal processing method of claim 1, wherein performing predetermined signal processing on the input audio signal after the first windowing processing comprises:

converting the input audio signal from time domain to frequency domain after the first windowing processing;

performing frequency domain signal processing on the converted input audio signal using a predetermined frequency domain signal processing algorithm; and converting the input audio signal after the frequency domain signal processing to generate the output audio signal.

18. An audio signal processing device comprises a non-transitory computer storage medium, on which one or more executable instructions are stored, wherein the one or more executable instructions can be executed by a processor of the audio signal processing device to perform the following steps:

sampling an original audio signal to generate audio data samples;

sub-framing the audio data samples to generate an input audio signal comprising a plurality of input data frames offset from each other by a predetermined frame shift and each of the plurality of input data frames having a predetermined frame length;

performing first windowing process on the plurality of input data frames in sequence with a first window function, a start point and an end point of the first window function being aligned with two ends of each input data frame respectively; wherein the first window function comprises a starting function portion starting from a starting region of the first window function, an ending function portion in an ending region of the first window function and an intermediate function portion in an intermediate region of the first window function between the starting region and the ending region; and wherein the intermediate function portion has a first weighting factor, the starting function portion changes from 0 at the start point to the first weighting factor adjacent to the intermediate region, the ending function portion changes from the first weighting factor adjacent to the intermediate region to 0 at the end point;

performing predetermined signal processing on the input audio signal after the first windowing processing and generating an output audio signal, wherein the output audio signal comprises a plurality of output data frames corresponding to the plurality of input data frames of the input audio signal, and each output data frame has the predetermined frame length;

performing a second windowing processing on the plurality of output data frames in sequence with a second window function, a start point and an end point of the second window function being aligned with two ends of each output data frame respectively; wherein the second window function comprises a suppression function portion in a suppression region of the second window function, an output function portion in an output region of the second window function, and a compensation function portion in a compensation region of the second window function between the suppression region and the output region, wherein the output region has a length equal to that of the ending region; wherein the suppression function portion starts from 0 at the start point and for suppressing the output audio signal, the output function portion ends at 0 at the end point; and the compensation function portion is configured to provide signal weighting related to the output function portion and to compensate a difference in signal weighting between the ending function portion and the first weighting factor, and wherein the compensation function portion changes from the suppression function portion adjacent to the suppression region to the output function adjacent to the output region; and outputting the plurality of output data frames after the second windowing processing by superimposing the plurality of output data frames with the predetermined frame shift to an audio playback module of the audio signal processing device for playing back the output audio signal.

19. A non-transitory computer storage medium on which one or more executable instructions are stored, wherein the one or more executable instructions can be executed by a processor of an audio device to perform the following steps:

sampling an original audio signal to generate audio data samples;

sub-framing the audio data samples to generate an input audio signal comprising a plurality of input data frames offset from each other by a predetermined frame shift and each of the plurality of input data frames having a predetermined frame length;

performing first windowing process on the plurality of input data frames in sequence with a first window function, a start point and an end point of the first window function being aligned with two ends of each input data frame respectively; wherein the first window function comprises a starting function portion starting from a starting region of the first window function, an ending function portion in an ending region of the first window function and an intermediate function portion in an intermediate region of the first window function between the starting region and the ending region; and wherein the intermediate function portion has a first weighting factor, the starting function portion changes from 0 at the start point to the first weighting factor adjacent to the intermediate region, the ending function portion changes from the first weighting factor adjacent to the intermediate region to 0 at the end point;

performing predetermined signal processing on the input audio signal after the first windowing processing and generating an output audio signal, wherein the output audio signal comprises a plurality of output data frames corresponding to the plurality of input data frames of the input audio signal, and each output data frame has the predetermined frame length;

performing a second windowing processing on the plurality of output data frames in sequence with a second window function, a start point and an end point of the second window function being aligned with two ends of each output data frame respectively; wherein the second window function comprises a suppression function portion in a suppression region of the second window function, an output function portion in an output region of the second window function, and a compensation function portion in a compensation region of the second window function between the suppression region and the output region, wherein the output region has a length equal to that of the ending region; wherein the suppression function portion starts from 0 at the start point and for suppressing the output audio signal, the output function portion ends at 0 at the end point; and the compensation function portion is configured to provide signal weighting related to the output function portion and to compensate a difference in signal weighting between the ending function portion and the first weighting factor, and wherein the compensation function portion changes from the suppression function portion adjacent to the suppression region to the output function adjacent to the output region; and outputting the plurality of output data frames after the second windowing processing by superimposing the plurality of output data frames with the predetermined frame shift to an audio playback module of the audio device for playing back the output audio signal.

* * * * *